United States Patent
Singh et al.

(10) Patent No.: US 10,638,326 B2
(45) Date of Patent: Apr. 28, 2020

(54) LONG TERM EVOLUTION (LTE) SYSTEM OPERATING IN AN UNLICENSED SPECTRAL BAND WITH ACTIVE NETWORK DISCOVERY AND OPTIMIZATION OF THE UNLICENSED CHANNELS

(71) Applicant: Corning Optical Communications LLC, Charlotte, NC (US)

(72) Inventors: Jaspreet Singh, San Diego, CA (US); Tsung-Yi Chen, San Jose, CA (US); Hithesh Nama, Los Altos, CA (US)

(73) Assignee: Corning Optical Communications LLC, Charlotte, NC (US)

( * ) Notice: Subject to any disclaimer, the term of this patent is extended or adjusted under 35 U.S.C. 154(b) by 100 days.

(21) Appl. No.: 15/437,552

(22) Filed: Feb. 21, 2017

(65) Prior Publication Data

US 2017/0245153 A1   Aug. 24, 2017

Related U.S. Application Data

(60) Provisional application No. 62/297,199, filed on Feb. 19, 2016.

(51) Int. Cl.
*H04W 16/14* (2009.01)
*H04B 7/26* (2006.01)
(Continued)

(52) U.S. Cl.
CPC .......... *H04W 16/14* (2013.01); *H04B 7/2643* (2013.01); *H04W 16/10* (2013.01); *H04W 72/1215* (2013.01); *H04W 76/36* (2018.02)

(58) Field of Classification Search
CPC . H04W 16/14; H04W 72/1215; H04B 7/2643
See application file for complete search history.

(56) References Cited

U.S. PATENT DOCUMENTS

2016/0128084 A1* 5/2016 Novlan ............ H04W 72/1268
370/329
2016/0345345 A1* 11/2016 Malik .................... H04W 48/04
(Continued)

OTHER PUBLICATIONS

3GPP TR 36.921 version 13.0.0, Jan. 2016 (Year: 2016).*

*Primary Examiner* — Un C Cho
*Assistant Examiner* — Yu-Wen Chang
(74) *Attorney, Agent, or Firm* — C. Keith Montgomery

(57) ABSTRACT

A method for assigning a percentage of a CSAT time cycle to each radio node (RN) in a plurality of RNs that belong to a small cell radio access network (RAN) having a central controller includes: (i) for each time cycle period during which the RNs share a channel with one or more nodes that employ a different radio access technology (RAT), assigning a default occupancy percentage of the time cycles to each of the RNs; (ii) determining if the default occupancy percentage is able to be increased without violating one or more co-existence principles pre-established for the RAT employed by the RNs in the RAN and the different RAT; (iii) increasing the occupancy percentage of the first RN if it is determined that the default occupancy percentage is able to be increased without violating the co-existence principles; and (iv) sequentially repeating (ii)-(iii) for each remaining RN in the RAN.

20 Claims, 6 Drawing Sheets

(51) Int. Cl.
*H04W 72/12* (2009.01)
*H04W 16/10* (2009.01)
*H04W 76/36* (2018.01)

(56) References Cited

U.S. PATENT DOCUMENTS

2017/0063484 A1* 3/2017 Naghshvar ............ H04J 11/0023
2018/0124807 A1* 5/2018 Smith ................... H04W 16/14

* cited by examiner

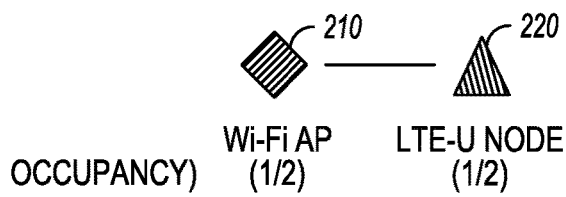
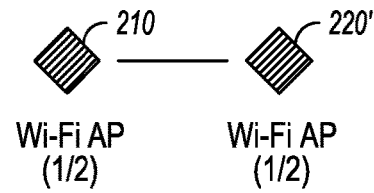
FIG. 4A        FIG. 4B
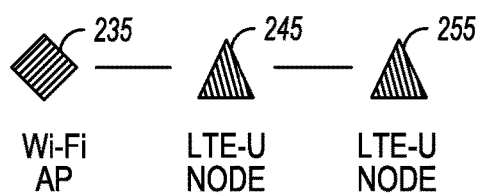
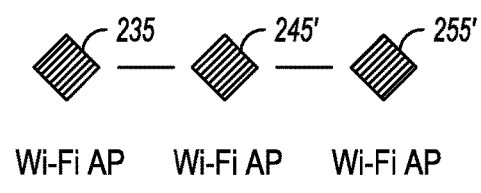
FIG. 5A        FIG. 5B
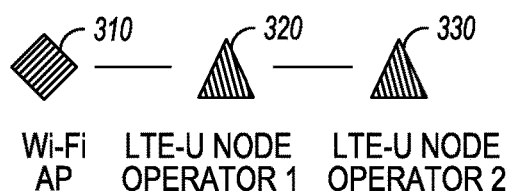
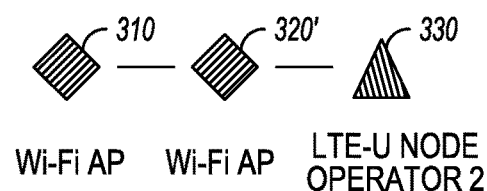
FIG. 6A        FIG. 6B

| TYPICAL DISTRIBUTED DECISION | CENTRALIZED DECISION | FIGURATIVE WI-FI BEHAVIOR |
|---|---|---|
| 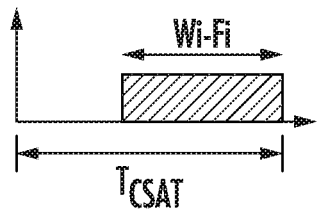 | 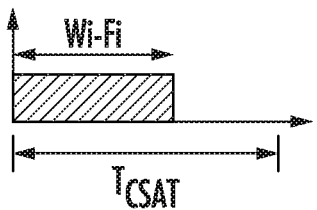 | 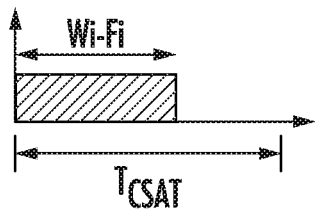 |
| *FIG. 7A(I)* | *FIG. 7B(I)* | *FIG. 7C(I)* |
| 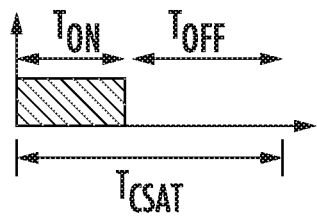 | 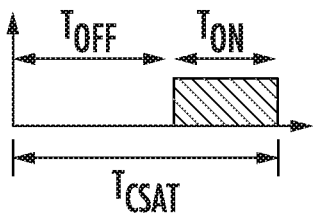 | 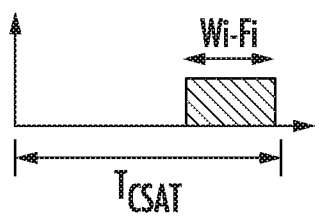 |
| *FIG. 7A(II)* | *FIG. 7B(II)* | *FIG. 7C(II)* |
| 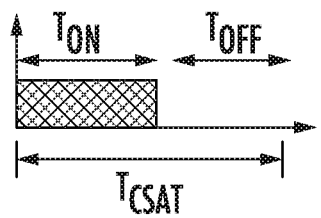 | 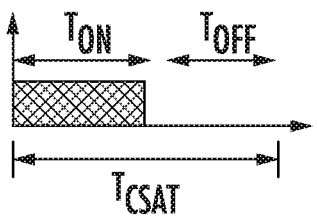 | 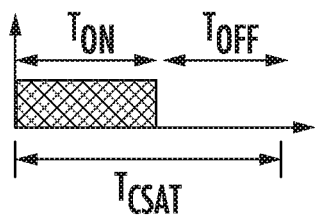 |
| TWO OPERATOR'S LTE-U NODES INTERFERE WITH EACH OTHER | BEST SPECTRUM USAGE FAIR SHARING | MIDDLE Wi-Fi NODE WILL BE FORCED TO FURTHER SHARE ITS CHANNEL TIME WITH LEFT Wi-Fi NODE |
| *FIG. 7A(III)* | *FIG. 7B(III)* | *FIG. 7C(III)* |

US 10,638,326 B2

LONG TERM EVOLUTION (LTE) SYSTEM OPERATING IN AN UNLICENSED SPECTRAL BAND WITH ACTIVE NETWORK DISCOVERY AND OPTIMIZATION OF THE UNLICENSED CHANNELS

CROSS-REFERENCE TO RELATED APPLICATION

This application claims the benefit of U.S. Provisional Application Ser. No. 62/297,199, filed Feb. 19, 2016 entitled ACTIVE NETWORK DISCOVERY AND OPTIMIZATION IN UNLICENSED CHANNELS, the contents of which are incorporated herein by reference in its entirety.

BACKGROUND

Operators of mobile systems, such as universal mobile telecommunications systems (UMTS) and its offspring including LTE (long term evolution) and LTE-advanced, continue to rely on advanced features to improve the performance of their radio access networks (RANs). These RANs typically utilize multiple-access technologies capable of supporting communications with multiple users using radio frequency (RF) signals and sharing available system resources such as bandwidth and transmit power.

Recently, LTE systems have begun to extend their operation into unlicensed frequency bands such as the 5 GHz band, which is currently primarily used by WiFi systems conforming to the IEEE 802.11 specification. A technical specification being developed for the use of LTE technology in unlicensed bands is referred to as LTE in Unlicensed (LTE-U). Because of the additional frequency resources that are made available by the use of an unlicensed frequency band, it is possible to assign different, non-overlapping channels to different cells, simultaneously allowing system capacity improvements and reductions in interference.

An important principle that is to be observed when operating LTE in an unlicensed band is to ensure that LTE-U co-exists with current technologies such as Wi-Fi on a fair basis that allows both technologies to use channels in that band. More particularly, one priority is that LTE-U should not behave more aggressively toward an access point using the competing technology (e.g., Wi-Fi) than two access points using the competing technology would behave toward one another. That is, LTE-U should not degrade the performance of the competing technology any more than would two interfering devices that both use the competing technology.

In general, coexistence mechanisms begin by selecting a channel in the unlicensed band that is currently not being used by the competing technology in order to avoid interference. A channel selection algorithm monitors the operating channel on an on-going basis and will change to a more suitable channel if needed. If no unused channel is available, a Carrier Sensing Adaptive Transmission (CSAT) algorithm is used to apply time-division multiplexing based access (TDMA) techniques to LTE-U cells, based on long-term carrier sensing of co-channel activities of the competing technologies. In this way the two technologies can share the channel fairly. In particular, CSAT defines a time cycle and the LTE-U cell transmits in a fraction of the cycle and gates off for the remainder of the cycle. The duty cycle of transmission vs. gating off is dictated by the sensed medium activity of the competing technology.

One issue that needs to be addressed when CSAT is employed as a coexistence mechanism concerns how the aforementioned co-existence principles can be observed while optimizing system performance.

SUMMARY

In accordance with one aspect of the subject matter disclosed herein, a method is shown for assigning a percentage of time to each radio node (RN) in a plurality of RNs that belong to a first small cell RAN having a central controller operatively coupled to each of the RNs. The percentage of time is a percentage of time during which each of the RNs are able to occupy a channel shared by nodes employing a different radio access technology (RAT) from a RAT employed by the first RAN. In accordance with the method: (i) for each repetitive period defined by a time-division multiplexing access (TDMA) technique during which the RNs share a channel with one or more nodes that employ the different RAT, assigning, with the central controller, a default occupancy percentage of the time periods to each of the RNs during which the RNs are able to occupy the channel; (ii) determining, with the central controller, if the default occupancy percentage for a first of the RNs is able to be increased without violating one or more co-existence principles pre-established for the RAT employed by the RNs in the first RAN and the different RAT employed by the one or more nodes; (iii) assigning, with the central controller, an increased occupancy percentage to the first RN if it is determined that the default occupancy percentage for the first RN is able to be increased without violating the one or more co-existence principles; and (iv) sequentially repeating (ii)-(iii) for each remaining one of the RNs in the first RAN.

BRIEF DESCRIPTION OF THE DRAWINGS

FIGS. 4A and 4B each show network topologies in which two nodes are able to interfere with one another.

FIGS. 5A and 5B each show network topologies in which three nodes are present in which the middle node is able to interfere with both of its neighbors and, in FIG. 5A, two of the nodes belong to the same small cell radio access network.

FIGS. 6A and 6B each show alternative network topologies in which three nodes are present in which the middle node is able to interfere with both of its neighbors and, in FIG. 6A, two of the nodes belong to different small cell radio networks.

FIGS. 7A(I)-7C(III) show the results of three different decision rules for allocating channel occupancy percentages and transmission start times for the network topologies shown in FIGS. 6A and 6B.

DETAILED DESCRIPTION

Various systems, methods, and apparatuses are described in which unlicensed spectrum is used for LTE communications. Various deployment scenarios may be supported including a supplemental downlink mode of operation in which the LTE primary component carrier (PCC) uses the licensed spectrum and the LTE-U secondary component carrier (SCC) uses the unlicensed spectrum. More generally, in some implementations downlink and/or uplink traffic between a cell and a UE may be offloaded to an unlicensed spectrum. The unlicensed spectrum that is employed may range, by way of example and not as a limitation on the techniques described herein, from 600 Megahertz (MHz) to 6 Gigahertz (GHz).

Moreover, the techniques described herein are not limited to LTE-based technologies (e.g., LTE-U, LAA), and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of illustration, and LTE terminology is used in much of the description below, although the techniques are applicable beyond LTE applications. In this description, LTE-Advanced (LTE-A) communications are considered to be a subset of LTE communications, and therefore, references to LTE communications encompass LTE-A communications.

Figure 1:
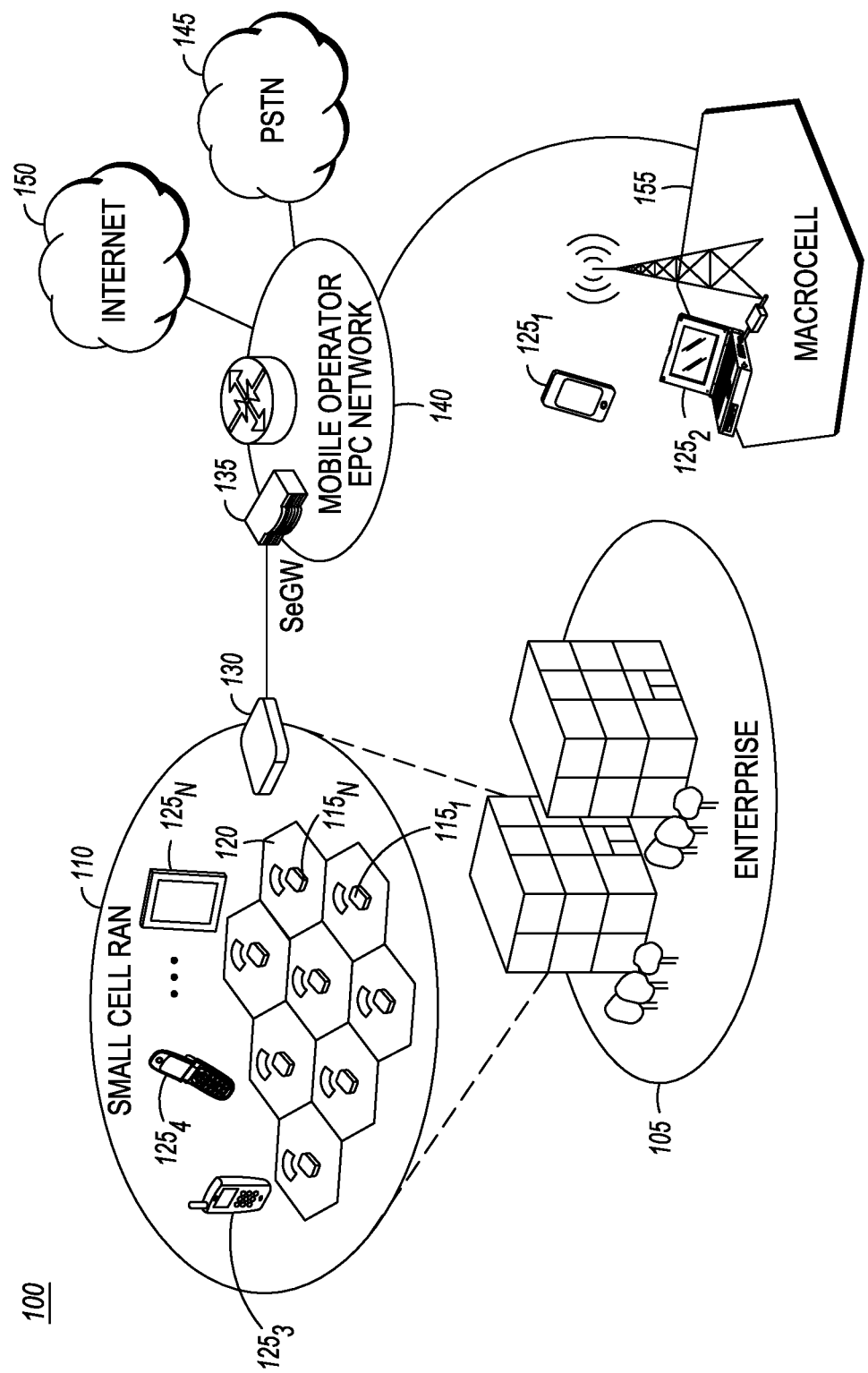
FIG. 1 shows an enterprise in which a small cell radio access network (RAN) is implemented.

FIG. 1 shows an enterprise 105 in which a small cell RAN 110 is implemented. The small cell RAN 110 includes a plurality of radio nodes (RNs) $115_1 \ldots 115_N$. Each radio node 115 has a radio coverage area (graphically depicted in the drawings as hexagonal in shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals $125_1$-N in FIG. 1).

The small cell RAN 110 includes an access controller 130 that serves as a central controller managing and controlling the radio nodes 115. One example of an access controller that operates in a mobile (small cell) RAN is the SpiderCloud services node, available from SpiderCloud Wireless, Inc. The radio nodes 115 are coupled to the access controller 130 over a direct or local area network (LAN) connection (not shown in FIG. 1) typically using secure IPsec tunnels. The access controller 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
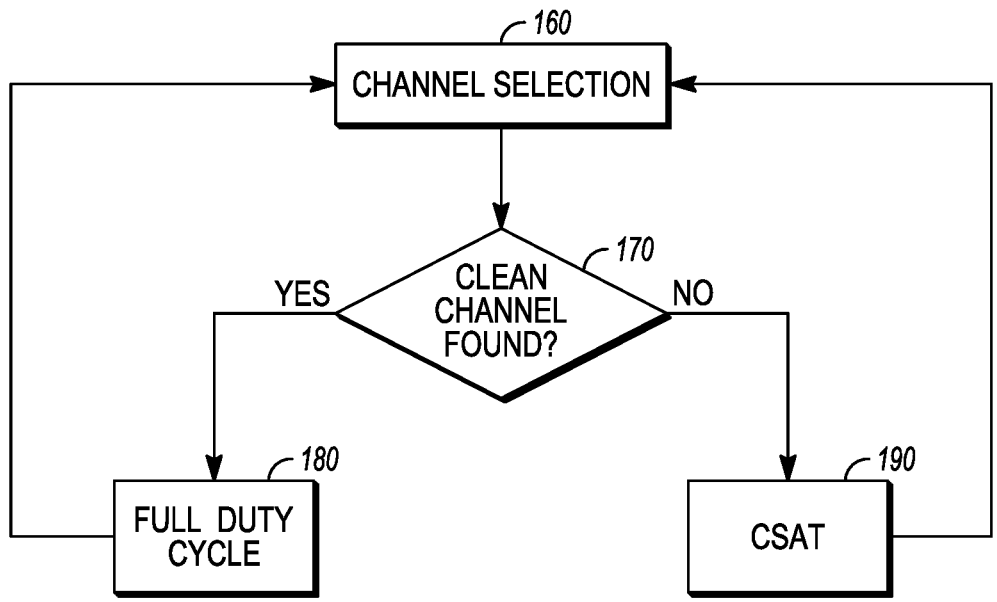
FIG. 2 is a flowchart illustrating a simplified example of a method for operating an LTE-U system in an unlicensed frequency band.

FIG. 2 is a flowchart illustrating a simplified example of a method for operating an LTE-U system in an unlicensed frequency band. The method may be used by radio nodes, base stations and/or UEs such as the RNs 115 and UEs 125 shown in FIG. 1, for example. In this example a RN uses the method to provide downlink transmissions. First, in step 160 a channel is selected by a small cell based on LTE measurements. To make the selection, the small cell scans the unlicensed band in decision step 170 and determines if a clean channel is available for the carrier transmission. This ensures that interference is avoided between the small cell and its neighboring Wi-Fi devices and LTE-U RNs in other RANs controlled by different operators (referred to herein as external LTE-U RNs), provided an unused channel is available. If a clear channel is found, the small cell will transmit on that channel using the full duty cycle in step 180. The channel selection algorithm monitors the status of the operating channel on an on-going base, and if needed will select a more suitable one and change.

Figure 3:
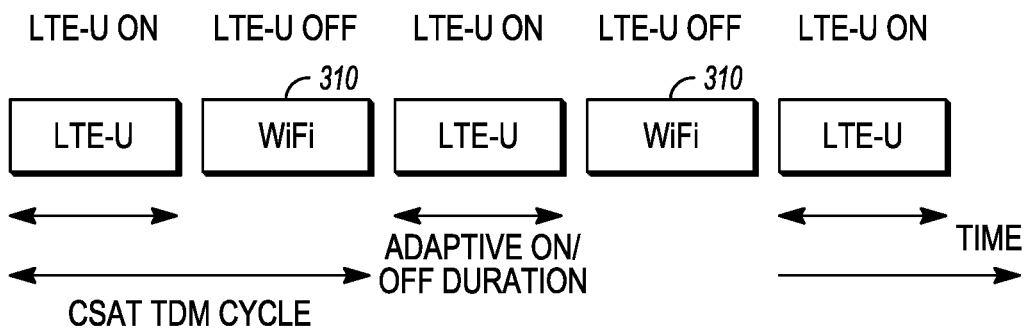
FIG. 3 shows the duty cycle of an LTE-U cell operating in accordance with a Carrier Sensing Adaptive Transmission (CSAT) algorithm.

If no unused channel is available in step 170, a Carrier Sensing Adaptive Transmission (CSAT) algorithm is used in step 190 to apply time-division multiplexing based access techniques to LTE-U cells, based on long-term carrier sensing of co-channel activities of the competing technologies. In this way the two technologies can share the channel fairly. In particular, CSAT defines a time cycle and the LTE-U cell transmits in a fraction of the cycle and gates off for the remainder of the cycle. The duty cycle of transmission vs gating off is dictated by the sensed medium activity of other devices and technologies. This use of a shared channel is depicted in the timeline shown in FIG. 3. During the LTE-U OFF period 310, the channel is clean to neighboring Wi-Fi nodes, which can resume normal Wi-Fi transmissions. The small cell or UE will measure the Wi-Fi medium utilization during the LTE-U off period 310, and adaptively adjust the on/off duty cycle accordingly. The TDM cycle can be set to a few hundreds of msec, for instance, which can effectively accommodate the activation/de-activation procedures while controlling the data transmission delay.

As previously mentioned, one issue that needs to be addressed when CSAT is employed as a coexistence mechanism concerns how the aforementioned co-existence principles can be observed while optimizing system performance. In particular, LTE-U systems operating on an unlicensed channel should not degrade the performance of a competing technology (e.g., Wi-Fi) any more than would interfering devices that both use the competing technology. While mobile systems that operate in a distributed manner may be able to ensure that these co-existence principles are observed and accounted for locally, they cannot do so in a global manner that optimizes various performance metrics such as capacity. However, such optimization can be achieved in a mobile system that employs a central processor such as the access controller 130 shown in FIG. 1 that can communicate with each RN 115 in the system.

Because the access controller 130 is in communication with the entire RAN, it is able to optimize the use of channels in unlicensed bands while treating the competing technology that uses those same bands on a fair basis. Accordingly, the access controller may be used as part of a process for selecting the best CSAT strategy in one or more unlicensed channels for use by different cells in a mobile system. Examples of an active probing technique to discover the network topology and to determine the globally optimal channel occupancy time (i.e., the duration of the ON period) and transmission timing are shown below. Of course, this technique is not limited to the particular small cell RAN or the particular access controller shown above, which are presented for illustrative purposes only. Moreover, the techniques described herein are not limited to the particular problem of determining the CSAT parameters discussed above, which are presented for illustrative purposes only.

The advantages that can arise from the use of a central controller such as access controller 130 will be illustrated with reference to FIGS. 4 and 5. FIGS. 4A and 4B present a canonical example in which two nodes, Wi-Fi access point (AP) 210 and LTE-U RN 220, are sufficiently close so that they are aware of one another and can interfere with one another when operating on the same channel. In order to determine how the channel occupancy time of the CSAT time cycle is to be divided between the two nodes so that the Wi-Fi AP 210 is treated as fairly by the LTE-U RN 220 as it would be treated by another Wi-Fi AP, consider the case shown in FIG. 4B, which replaces the LTE-U RN 220 with Wi-Fi AP 220'. In this case it is clear that the two nodes would share the channel equally so that each is allowed to occupy the channel for half of the time. Accordingly, in FIG. 4A, the Wi-Fi AP 210 and LTE-U RN 220 should each be allowed to occupy the channel for half of the CSAT time cycle as well.

FIGS. 5A and 5B show another, more complex situation in which there are three nodes, Wi-Fi AP 235, LTE-U RN 245 and LTE-U RN 255. LTE-U RN 245 is sufficiently proximate to both Wi-Fi AP 235 and LTE-U RN 255 so that they can interfere with one another and thus they cannot both transmit at the same time. However, Wi-Fi AP 235 and LTE-U RN 255 are sufficiently remote from one another that they are not aware of each other and cannot interfere with one another. Once again, to determine how the channel occupancy time is to be divided among the three nodes so that the Wi-Fi AP 235 is treated as fairly by the LTE-U RNs 245 and 255 as it would be treated by other Wi-Fi APs, consider the case shown in FIG. 5B, which replaces the LTE-U RNs 245 and 255 with Wi-Fi APs 245' and 255'.

In this case the impact is examined of four different decision rules on the fraction of the channel occupancy time that is to be assigned to each of the three nodes. Two of the rules are distributed decision rules which illustrate how the channel occupancy time would be allocated if each node makes its own allocation decisions based on the neighboring nodes it is able to observe. A third rule is the decision that would be made if all three nodes were Wi-Fi APs. The final rule illustrates the decision that may be made a central controller (e.g., access controller 130) that has access to the entire RAN in which the LTE-U RNs operate. The results of these rules for each node are presented below in Table 1.

TABLE 1

| Decision Rule | Left Node | Middle Node | Right Node |
|---|---|---|---|
| D1 | 2/3 | 1/3 | 1/2 |
| D2 | 1/3 | 2/3 | 1 |
| Wi-Fi Decision | 2/3 | 1/3 | 2/3 |
| Centralized Decision | 2/3 | 1/3 | 1 |

Looking first at the Wi-Fi decision rule (row three in Table 1), consider first the middle Wi-Fi AP 245' in FIG. 5B. Since this node sees two other nodes that may interfere with it, it decides that it should occupy 1/3 of the CSAT time cycle, which would therefore allow the left Wi-Fi AP 235' to occupy 2/3rds of the time cycle. Looking next at the right Wi-Fi AP 255', since the only node that interferes with it is the middle Wi-Fi AP 245' and that node occupies only 1/3rd of the time, the right Wi-Fi AP 255' determines that it can occupy 2/3rds of the time cycle. Thus, this allocation of the CSAT time cycle as determined by the Wi-Fi decision rule would be applicable to the three nodes shown in FIG. 5A.

The first row in Table 1 illustrates the allocation of the time cycle for the three nodes in FIG. 4A as determined in accordance with the first distributed decision rule D1. The premise of this rule is that all nodes that could interfere with one another should equally share the CSAT time cycle, regardless of the network operator of each node. The fraction of the time cycle occupied by any node n, denoted $f_n$, may be determined by the following formula:

$$f_n = \frac{1}{\text{all neighboring nodes seen by node } n + 1}$$

As shown in Table 1, this rule yields the same allocation for the Wi-Fi AP 235 as the Wi-Fi decision rule and thus it is fair to the Wi-Fi AP 235. Likewise, it also yields the same allocation as the Wi-Fi decision rule for the middle LTE-U RN 245. However, the rule D1 only allocates 1/2 of the channel occupancy time to the right LTE-U RN 255, which is less than that allocated by the next distributed decision rule D2. Accordingly, while decision rule D1 is fair to the Wi-Fi AP 235, it is too conservative in that it does not maximize the spectral efficiency since LTE-U RN 255 could occupy more of the CSAT time cycle than it has been allocated.

The second row in Table 1 illustrates the allocation of the channel occupancy time for the three nodes in FIG. 5A as determined in accordance with the second distributed decision rule D2. The premise of this rule is that all nodes occupy a fraction of the channel occupancy time that is proportional to the number of LTE-U RNs that are managed by the same network operator. The fraction of the time cycle occupied by any node n, denoted $f_n$, in accordance with decision rule D2 may be determined by the following formula:

$$f_n = \frac{\text{sum total of all intra-operator } LTE\text{-}U \text{ nodes seen by node } n}{\text{all neighboring nodes seen by node } n + 1}$$

As shown in Table 1, this rule only allocates $\frac{1}{3}^{rd}$ of the time cycle to the Wi-Fi AP 235 and thus it is not fair since it is being allocated less time than the Wi-Fi decision rule would allocate. Accordingly, this decision rule is too aggressive with respect to the Wi-Fi AP 235 and thus is not acceptable.

The fourth and final row in Table 1 illustrates the allocation of the channel occupancy time for the three nodes in FIG. 5A as determined by a central controller such as access controller 130, which has complete knowledge of the RAN topology to which LTE-U RNs 245 and 255 belong. First, since the controller is able to determine that LTE-U RN 245 and Wi-Fi AP 235 are able to interfere with one another but that Wi-Fi AP 235 and LTE-U RN 255 are not able to interfere with one another, it will allocate ⅔rds of the channel occupancy time to the Wi-Fi AP 235 to satisfy the co-existence principles. Since the central controller also knows that the right LTE-U RN 255 is not in the vicinity of the Wi-Fi AP 235 and thus will not interfere with it, the central controller allocates the entire time cycle to LTE-U RN 255.

Examining the four decision rules in Table 1 demonstrates that only the centralized decision rule maximizes the efficient use of the unlicensed channel while also not being more aggressive toward the Wi-Fi AP 235 than another Wi-Fi AP would be.

FIGS. 4-5 illustrated the advantages of a centralized decision rule for determining the fraction of a CSAT time cycle during which the LTE-U RNs should operate. Likewise, FIGS. 6-7 will be used to illustrate the advantages of a centralized decision rule on the transmission start times for the LTE-U RNs during each CSAT time cycle. FIG. 6A shows a situation similar to that shown in FIG. 5A in which there are three nodes, Wi-Fi AP 310, LTE-U RN 320 and LTE-U RN 330. LTE-U RN 320 is sufficiently proximate to both Wi-Fi AP 310 and LTE-U RN 330 so that they can interfere with one another. However, Wi-Fi AP 310 and LTE-U RN 330 are sufficiently remote from one another so that they are not aware of each other and cannot interfere with one another. Unlike FIG. 5A however, LTE-U RN 330 is an external node and thus LTE-U RN 320 and LTE-U RN 330 belong to different RANs controlled by different operators.

FIGS. 7A-7C show the results of the three different decision rules on both the fraction of the time cycle allocated to each node and the transmission start time for each node during a CSAT time cycle. In each case the top diagram (i) illustrates the behavior of the left Wi-Fi AP 310 in FIG. 6A during a time cycle, the middle diagram (ii) illustrates the behavior of the middle LTE-U RN 320 in FIG. 6A during a time cycle and the bottom diagram (iii) illustrates the behavior of the right LTE-U RN 330 in FIG. 6A during a time cycle.

For purposes of illustration LTE-U RN 320 is assumed to be the node that employs the centralized decision rules. Accordingly, when ensuring that Wi-Fi AP 310 is treated by the LTE-U RNs as fairly as it would be treated by another Wi-Fi AP, an arrangement is considered in FIG. 6B in which the LTE-U RN 320 is replaced with the Wi-Fi AP 320'. The fraction of the CSAT time cycle allocated to the Wi-Fi AP 310 and Wi-Fi AP 320' (and hence to LTE-U RN 320) is shown in FIG. 7C. In this case, treating the middle LTE-U RN 320 as a Wi-Fi AP, the LTE-U RN 320 is allocated ⅓ of the timing cycle since it can detect both of its neighboring nodes. As a consequence, Wi-Fi 310 is allocated ⅔ of the time cycle. The LTE-U RN 330, using its own distributed decision rule, is only aware of LTE-U RN 320 and hence is allocated ½ of the time cycle.

FIG. 7A shows the ON period durations and transmission start times during a time cycle for the three nodes of FIG. 6A in accordance with a typical distributed decision rule. Once again the allocations for the Wi-Fi AP 310, LTE-U RN 320 and LTE-U RN 330 are ⅔, ⅓ and ½, respectively. However, the LTE-U RNs 320 and 330 start their transmissions at the same time during the time cycle, thus causing interference. This may occur because although different LTE-U operators may use different decision algorithms, they often use the same timing schedule and thus their transmission start times may be aligned.

FIG. 7B shows the ON period durations and transmission start times during a time cycle for the three nodes of FIG. 6A when the LTE-U RN 320 employs a centralized decision rule that is implemented by a central controller. Once again the fractional allocations for the Wi-Fi AP 310, LTE-U RN 320 and LTE-U RN 330 are ⅔, ⅓ and ½, respectively. However, because the central controller in communication with the LTE-U RN 320 can detect the network topology of the external LTE-U RN 330 and the Wi-Fi node 310, it is aware that LTE-U RNs 320 and 330 may interfere with one another. Accordingly, as shown in FIG. 7B, it can adjust the transmission start time of the LTE-U RN 320 (without changing the fraction of the time cycle it occupies) so that it does not overlap with the transmissions of either the Wi-Fi AP 310 or the LTE-U RN 330. As also shown in FIG. 7B, the transmission times of the Wi-Fi AP 310 and the LTE-U RN 330 may overlap since they do not detect one another. In this way not only is the performance of the LTE-U RN 320 employing the centralized decision algorithm improved, but the performance of the external LTE-U RN 330 is improved as well.

In the examples presented above it was important to know how Wi-Fi APs would allocate the channel occupancy time among themselves if the LTE-U RNs were replaced with Wi-Fi APs. In order to determine this the Wi-Fi APs network topology first needs to be determined. This can be obtained by the LTE-U network using network listening results. Once the topology is available, along with the existence of external LTE-U that are not are part of the LTE-U network, any of a variety of algorithms may be employed to determine the expected Wi-Fi AP channel occupancy times.

Network listening results may also be used to determine the network topology of any external LTE-U RNs that may be present. However, one problem arises because, as previously mentioned, LTE-U network operators may use the same timing schedule and thus their transmission start times during the CSAT time cycle may be the same. This is a problem because the network topology discovery process involves the RNs in one network listening for signals from RNs in another network. If the RNs in both networks are transmitting at the same time and then listening at the same time during their synchronized OFF periods, they will not be able to detect one another. This problem can be overcome with the use of central controller. In particular, the central controller may iterate through each of the RNs in the RAN and sequentially cause them to be in the OFF state when they would otherwise be transmitting. In this way each RN can listen for signals from any external LTE-U RNs that may be present.

The examples presented above assume that the LTE-U RAN knows whether the Wi-Fi APs and the external LTE-Us that are not are part of the LTE-U RAN are able to detect one another. For instance, in FIG. 6A, it was assumed that no link exists between Wi-Fi AP 310 and LTE-U RN 330. This information can be inferred by the central controller in the LTE-U RAN using one LTE-U RN to transmit signals while the Wi-Fi APs in the proximity are operating and observing the changes in the behavior of the Wi-Fi APs using either another LTE-U RN or the same LTE-U RN. For instance, consider again the topology in FIG. 6A and the results of the distributed decision rule shown in FIG. 7A. As the results show, the ON period of LTE-U RN 320 does not overlap with the ON period of Wi-Fi AP 310 thus preventing interference between them. To infer whether a link exists between Wi-Fi AP 310 and LTE-U 330, the central controller in the LTE-U RAN adjusts the transmit start time of the LTE-U RN 320 so that it is delayed from the time shown in FIG. 7A (without changing the duration of its ON period). That is, the ON period for the LTE-U RN 320 is shifted or slid to the right so that it overlaps with the ON period of the Wi-Fi AP 310. The Wi-Fi AP 310 will then respond in one of two ways, depending on whether a link exists between it and the external LTE-U RN 330. If no link exists, then the Wi-Fi AP 310 will respond by shifting its own transmit start time, without changing its duration, so that its transmission time does not overlap with the ON period of the LTE-U RN 320. This is the behavior shown in FIG. 7B for Wi-Fi AP 310 and LTE-U RN 320. A second LTE-U RN in the RAN (or RN 320 itself) can be used to detect this Wi-Fi AP behavior and report it to the central controller. On the other hand, if a link does exist between the Wi-Fi AP 310 and the external LTE-U RN 330 so that they may interfere with one another, then the total duration of the transmission time for the Wi-Fi AP 310 will be observed by the second LTE-U RN in the RAN (or RN 320 itself) to decrease as a result of the interference. This procedure may be repeated as necessary to determine whether links exist between any pairs of Wi-Fi APs and external LTE-U RNs.

Figure 8:
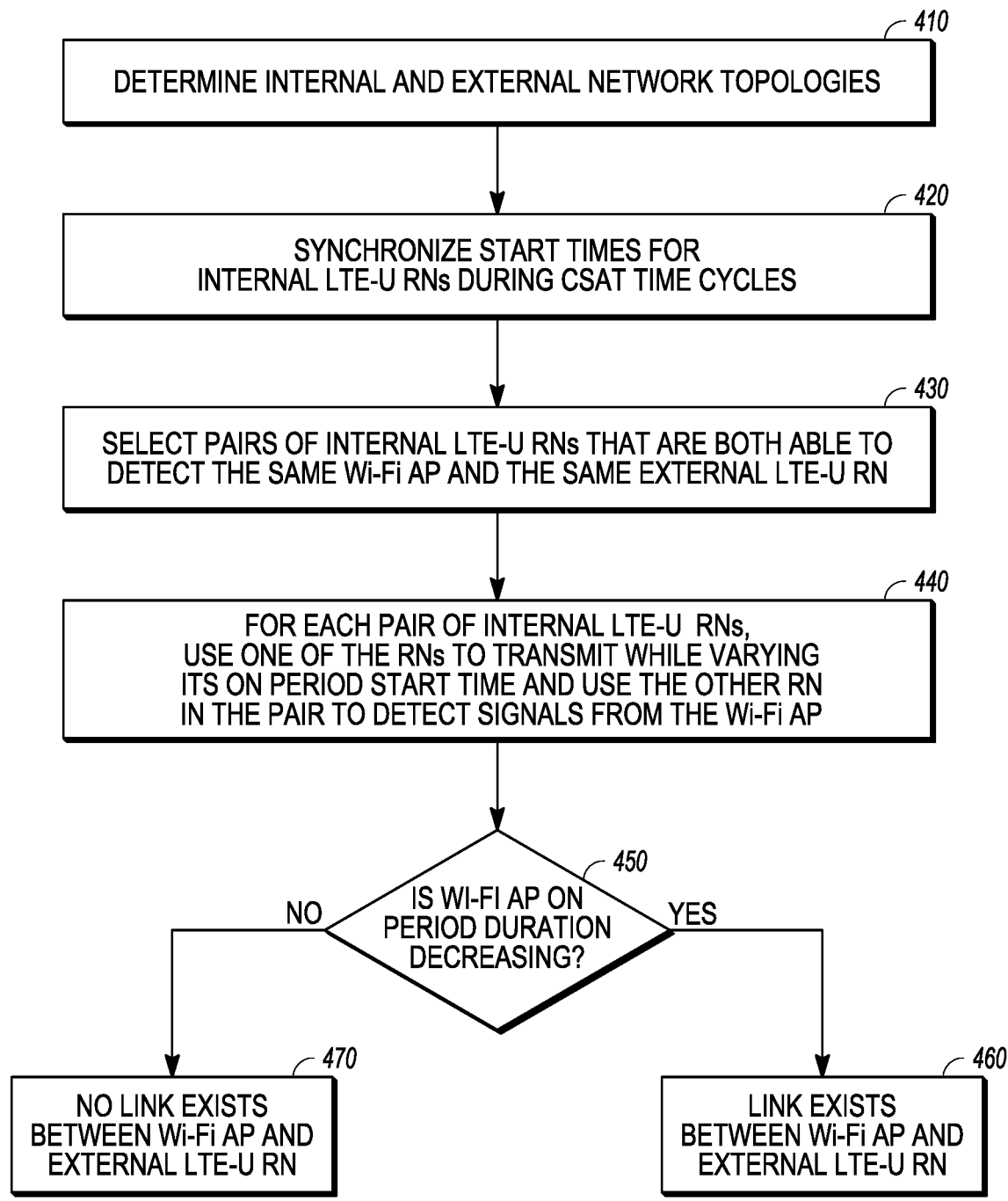
FIG. 8 shows one example of a method that may be performed by a central controller in a small cell LTE-U RAN to identify the existence of links between a Wi-Fi AP and an external LTE-U.

The process described above that is employed by the LTE-U network to identify the existence of links between a Wi-Fi AP and an external LTE-U may be summarized by the flowchart shown in FIG. 8. First, at block 410, the internal and external network topology is determined using, for example, radio environment monitoring (REM) scans that are performed under the control of the central controller. Next, at block 420, the ON periods for the internal LTE-U RNs are synchronized so that they start at e.g., the beginning of a CSAT time cycle. The central controller then selects at block 430 LTE-U RNs that can detect the same at least one external LTE-U RN and the same at least one Wi-Fi AP. For each pair of LTE-U RNs that are selected, one of them is used to transmit while varying its ON period start time (but not its duration) at block 440, either continuously or in a limited number of steps, while the other LTE-U RN is used to detect signals from a jointly detected Wi-Fi AP and determine whether the ON period of the Wi-Fi AP is decreasing. If at decision block 450 the ON period decreases by more than some threshold amount, then at block 460 a link is presumed to exist between the Wi-Fi AP and the external LTE-U RN. Otherwise it is presumed at block 470 that the Wi-Fi AP and the external LTE-U RN are not aware of one another and thus will not interfere.

Figure 9:
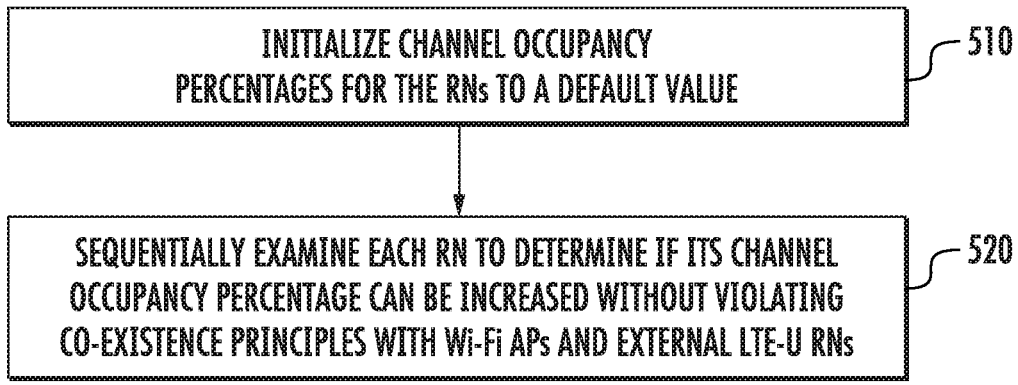
FIG. 9 is a flowchart showing one example of a method that may be performed by a central controller in a small cell LTE-U RAN to determine the channel occupancy percentages that should be allocated to the various LTE-U RNs during CSAT time cycles.

FIG. 9 is a flowchart showing one example of a method that may be performed by a central controller (e.g., access controller 130) in a small cell LTE-U RAN to determine the channel occupancy percentages that should be allocated to the various LTE-U RNs during CSAT time cycles. The method begins at block 510 when the channel occupancy percentages are initialized to default percentages. In one embodiment those percentages may be determined in accordance with the Wi-Fi decision rule. Next, at block 520 the central controller iterates through each of the LTE-U RNs in the RAN and examines whether the occupancy percentages can be increased while satisfying the following two conditions: (1) ensuring that the occupancy percentages of any Wi-Fi APs as determined by the Wi-Fi occupancy decision rule does not change; and (2) ensuring that any external LTE-U RNs that are present are provided with a fair share of the CSAT time cycle. In one embodiment, various distributed decisions rules may also be executed and used as a reference to determine which LTE-U RNs are candidates that may have their channel occupancy percentages increased while satisfying the two conditions specified above.

In some embodiments the decision making process described in FIG. 9 may employ a closed-loop process in which various performance indictors may be used to refine the percentage allocations and the transmission start times that are assigned to the LTE-U RNs. Examples of such performance indicators may be obtained from various sources such as UE channel quality indicator (CQI) reports and radio resource control (RRC) measurement reports, for instance. These performance indicators may also be used to decide whether to fall back to the default occupancy percentages and transmission start times.

Figure 10:
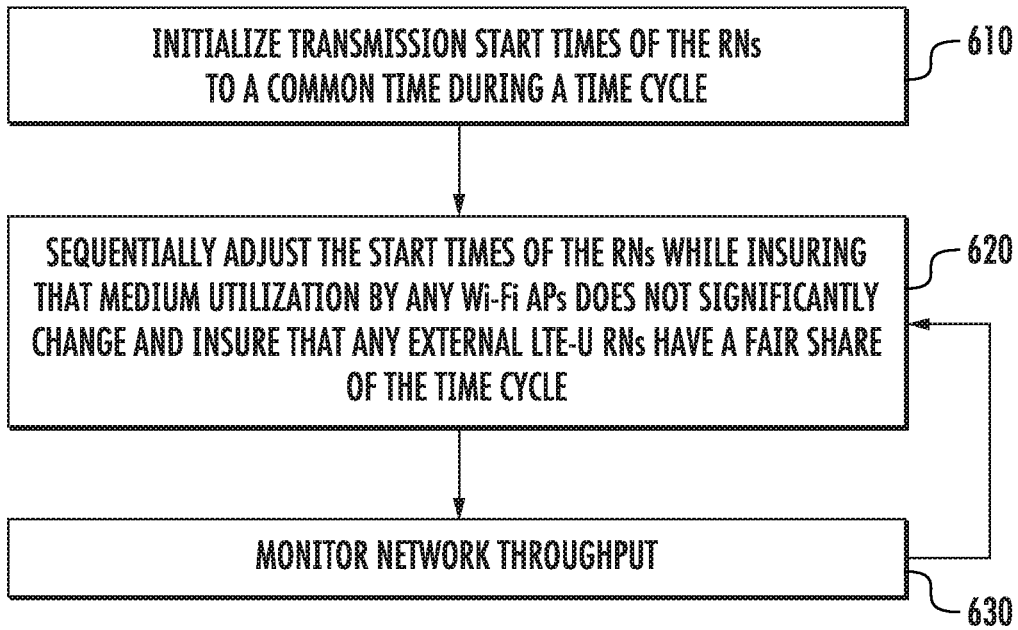
FIG. 10 is a flowchart showing one example of a method that may be performed by a central controller in a small cell LTE-U RAN to determine transmission start times that should be assigned to the various LTE-Us during CSAT time cycles once the percentages have been allocated.

FIG. 10 is a flowchart showing one example of a method that may be performed by a central controller in a small cell LTE-U RAN to determine transmission start times that should assigned to the various LTE-U RNs during CSAT time cycles once the percentages have been allocated. The method begins at block 610 when the transmission start times of the RANs are initialized to a common time, e.g., the start time of each time cycle. Next, at block 620, the transmission start times of the RNs are adjusted while ensuring that the medium utilization by any Wi-Fi APs does not significantly change and, if external LTE-U RNs are present, ensuring that they are provided with a fair share of the CSAT time cycle. The adjustments to the transmission start time may be continuous or quantized using a limited number of different timing positions. Next, at block 630, the central controller monitors the network throughput and determines if there has been any improvement. The monitoring may be accomplished, for example, using the performance indicators such as CQI reports and the like, which were discussed above. Based on this monitoring, the process can return to block 620 where additional adjustments can be made to refine the transmission start times based on the network throughput.

Several aspects of telecommunication systems will now be presented with reference to access controllers, base stations and UEs described in the foregoing description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

The invention claimed is:

1. A method for assigning a percentage of time to each radio node (RN) in a plurality of RNs that belong to a first small cell radio access network (RAN) having a central controller operatively coupled to each of the RNs the percentage of time being a percentage of time during which each of the RNs are able to occupy a channel shared by nodes employing a different radio access technology (RAT) from a RAT employed by the first small cell RAN, comprising:
 (i) for each repetitive period defined by a time-division multiplexing access (TDMA) technique during which the RNs share a channel with one or more nodes that employ the different RAT, assigning, with the central controller, a default occupancy percentage of time periods to each of the RNs during which the RNs are able to occupy the channel;
 (ii) determining, with the central controller, if the default occupancy percentage for a first RN of the RNs is able to be increased without violating one or more co-existence principles pre-established for the RAT employed by the RNs in the first small cell RAN and the different RAT employed by the one or more nodes;
 (iii) assigning, with the central controller, an increased occupancy percentage to the first RN if it is determined that the default occupancy percentage for the first RN is able to be increased without violating the one or more co-existence principles; and
 (iv) sequentially repeating (ii)-(iii) for each remaining one of the RNs in the first small cell RAN.

2. The method of claim 1, wherein the default occupancy percentage that is assigned to at least one of the RNs is determined by using a channel occupancy decision rule that would be employed if each of the RNs were to employ the different RAT.

3. The method of claim 1, wherein the one or more co-existence principles ensure that the RNs should not interfere with the one or more nodes employing the different RAT any more than would another node employing the different RAT.

4. The method of claim 1, wherein the TDMA technique employs a Carrier Sensing Adaptive Transmission (CSAT) algorithm.

5. The method of claim 1, wherein the first small cell RAN operates in accordance with Long Term Evolution—Unlicensed (LTE-U) and the shared channel is an unlicensed channel.

6. The method of claim 1, further comprising detecting an external network topology of the one or more nodes that employ the different RAT.

7. The method of claim 6, wherein the external network topology is detected using radio environment monitoring (REM) scans.

8. The method of claim 6, wherein the channel is also shared by a second RAN that operates in accordance with the RAT employed by the first small cell RAN, the second RAN being controlled by a different network operator than the first small cell RAN, and further comprising using the central controller to determine an external network topology of external RNs in the second RAN and which are able to interfere with one or more of the RNs in the first small cell RAN.

9. The method of claim 8, wherein determining the default occupancy percentage and any increases in the default occupancy percentage are based at least in part on the external network topology that is determined for the one or more nodes that employ the different RAT and on the external network topology that is determined for the external RNs in the second RAN.

10. The method of claim 8, wherein determining the external network topology of the external RNs in the second RAN includes using the central controller to sequentially cause each of the RNs in the first small cell RAN to be OFF during a normally ON portion of the time periods so that the RNs are able to detect transmissions from the external RNs in the second RAN while the RNs in the first small cell RAN are OFF.

11. The method of claim 9, further comprising determining if a link exists between one of the one or more nodes that employ the different RAT and the external RNs in the second RAN such that they are able to interfere with one another.

12. The method of claim 11, wherein determining if the link exists includes using the central controller to select at least one pair of the RNs that are each able to detect transmissions from at least one common one of the external RNs and at least one common one of the one or more nodes that employs the different RAT and using one of the RNs in the at least one pair to transmit while varying its transmission start time and using the other of the RNs in the at least one pair to detect signals from the one or more nodes that employs the different RAT, wherein the determining if the link exists is based on whether a transmission duration of the one or more nodes that employs the different RAT varies when the transmission start time of the RN in the at least one pair that transmits is varied.

13. The method of claim 1, further comprising adjusting, without changing the occupancy percentages that are assigned, a transmission start time for the first RN during the time periods so that an overlapping period of a transmission time for the first RN with any transmissions from the one or more nodes that employ the different RAT and that are able to interfere with the first RN is reduced.

14. The method of claim 1, wherein the one or more nodes employing the different RAT are Wi-Fi Access Points.

15. A centralized controller operable in a cell in a first small cell radio access network (RAN), comprising:
   one or more processors;
   a network interface operatively coupled to the one or more processors and arranged for bidirectional communications with a plurality of radio nodes (RNs) in the first small cell RAN; and
   memory operatively coupled to the one or more processors, the memory storing computer-readable instructions which, when executed by the one or more processors, implement a method for assigning a percentage of time to each of the RNs in the plurality of RNs, the percentage of time being a percentage of time during which each of the RNs are able to occupy a channel shared by nodes employing a different radio access technology (RAT) from a RAT employed by the first small cell RAN, comprising:
      (i) for each repetitive period defined by a time-division multiplexing access (TDMA) technique during which the RNs share a channel with one or more nodes that employ the different RAT, assigning a default occupancy percentage of time periods to each of the RNs during which the RNs are able to occupy the channel;
      (ii) determining if the default occupancy percentage for a first RN of the RNs is able to be increased without violating one or more co-existence principles pre-established for the RAT employed by the RNs in the first small cell RAN and the different RAT employed by the one or more nodes;
      (iii) assigning an increased occupancy percentage to the first RN if it is determined that the default occupancy percentage for the first RN is able to be increased without violating the one or more co-existence principles; and
      (iv) sequentially repeating (ii)-(iii) for each remaining one of the RNs in the first small cell RAN.

16. The centralized controller of claim 15, wherein the computer-readable instructions comprise instructions that, when executed by the one or more processors, cause the centralized controller to assign the default occupancy percentage to at least one of the RNs that is determined by using a channel occupancy decision rule that would be employed if each of the RNs were to employ the different RAT.

17. The centralized controller of claim 15, wherein the computer-readable instructions comprise instructions that, when executed by the one or more processors, cause the centralized controller to apply the one or more co-existence principles that ensure that the RNs should not interfere with the one or more nodes employing the different RAT any more than would another node employing the different RAT.

18. The centralized controller of claim 15, wherein the channel is also shared by a second small cell RAN that operates in accordance with the RAT employed by the first small cell RAN, the second small cell RAN being controlled by a different network operator than the first small cell RAN, and wherein the computer-readable instructions comprise instructions that, when executed by the one or more processors, cause the centralized controller to:
   detect an external network topology of the one or more nodes that employ the different RAT; and
   determine an external network topology of external RNs in the second small cell RAN and which are able to interfere with one or more of the RNs in the first small cell RAN.

19. The centralized controller of claim 18, wherein the computer-readable instructions comprise instructions that, when executed by the one or more processors, cause the centralized controller to determine the default occupancy percentage and any increases in the default occupancy percentage based at least in part on the external network topology that is determined for the one or more nodes that employ the different RAT and on the external network topology that is determined for the external RNs in the second small cell RAN.

20. The centralized controller of claim 18, wherein the computer-readable instructions comprise instructions that, when executed by the one or more processors, cause the centralized controller to determine the external network topology of the external RNs in the second small cell RAN by sequentially causing each of the RNs in the first small cell RAN to be OFF during a normally ON portion of the time periods so that the RNs are able to detect transmissions from the external RNs in the second small cell RAN while the RNs in the first small cell RAN are OFF.

* * * * *

UNITED STATES PATENT AND TRADEMARK OFFICE
CERTIFICATE OF CORRECTION

PATENT NO. : 10,638,326 B2
APPLICATION NO. : 15/437552
DATED : April 28, 2020
INVENTOR(S) : Jaspreet Singh et al.

It is certified that error appears in the above-identified patent and that said Letters Patent is hereby corrected as shown below:

In the Claims

In Column 11, Line 52, Claim 1, delete "RNs" and insert -- RNs, --, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*